3 Sheets—Sheet 2.
J. G. MOLE.
CORN-PLANTER.
No. 169,721. Patented Nov. 9, 1875.
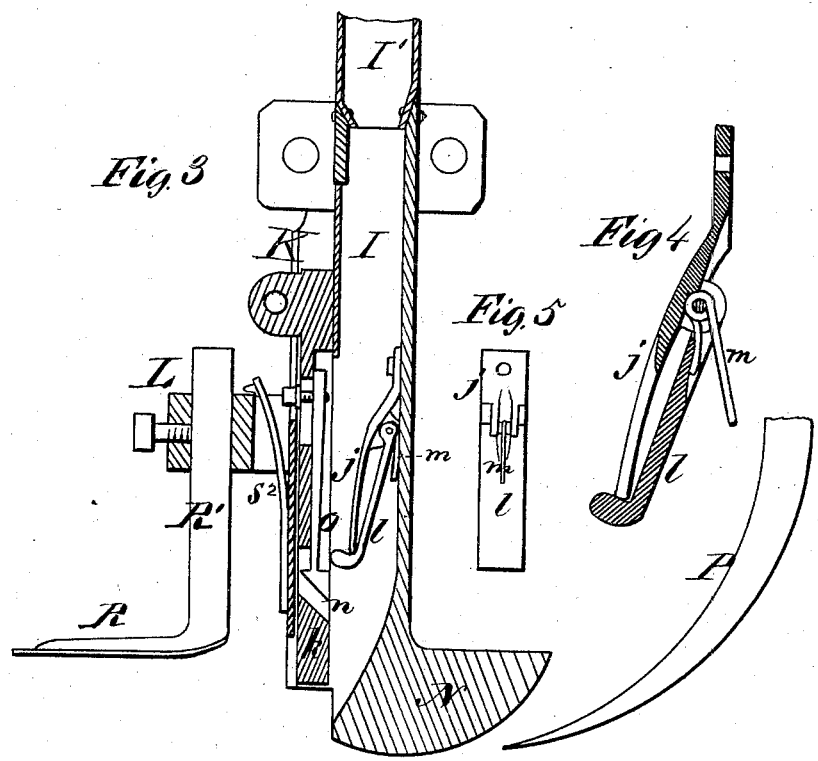
WITNESSES
INVENTOR
John G. Mole,
ATTORNEYS

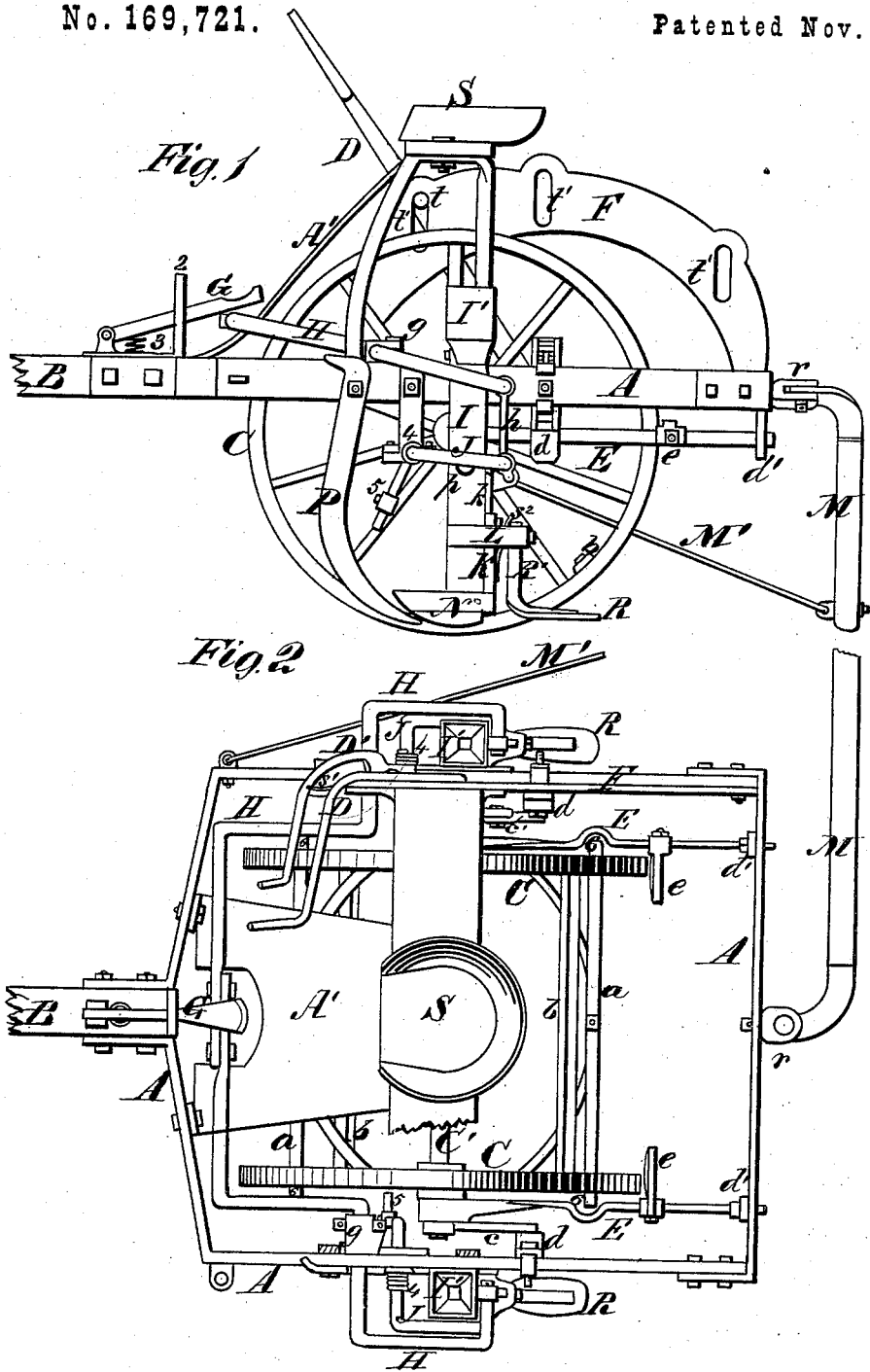

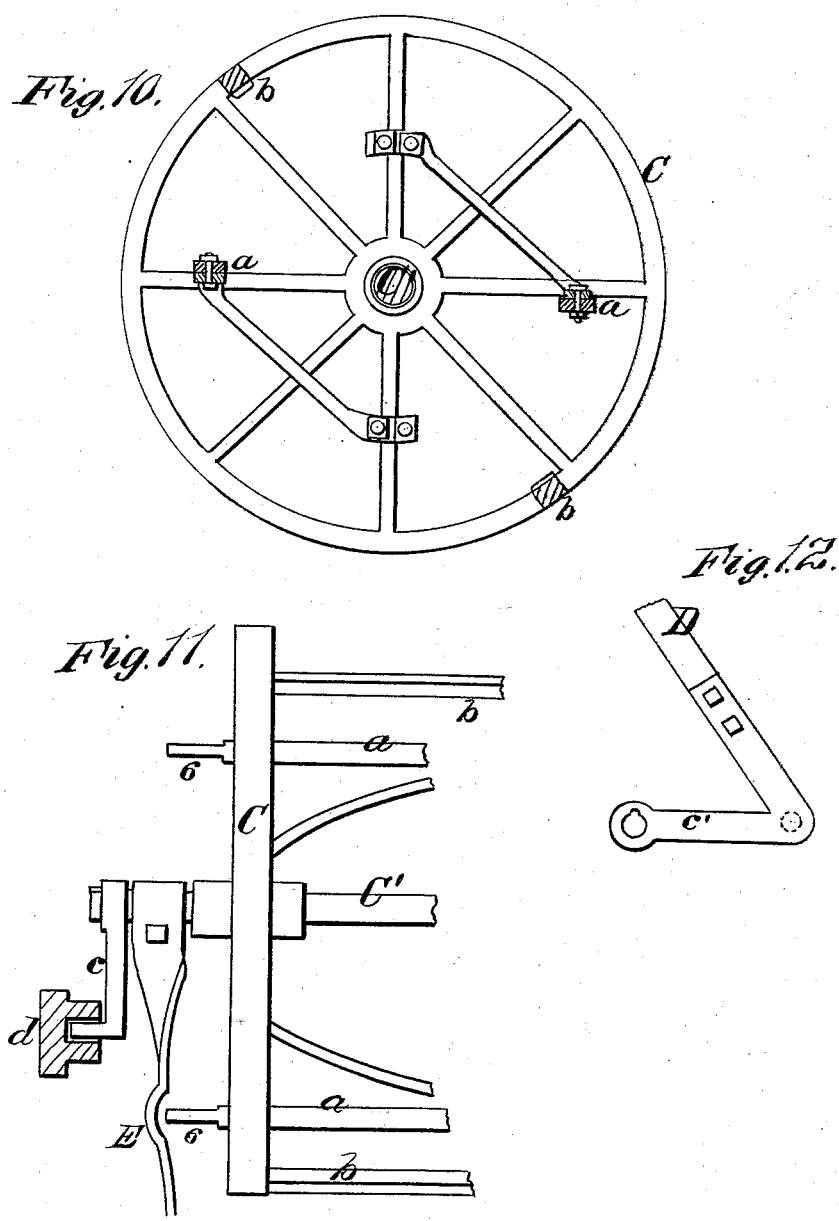

UNITED STATES PATENT OFFICE.

JOHN G. MOLE, OF SARPY CENTRE, NEBRASKA, ASSIGNOR OF ONE-HALF HIS RIGHT TO BYRON HUFF, OF SAME PLACE.

IMPROVEMENT IN CORN-PLANTERS.

Specification forming part of Letters Patent No. 169,721, dated November 9, 1875; application filed June 11, 1875.

*To all whom it may concern:*

Be it known that I, JOHN G. MOLE, of Sarpy Centre, in the county of Sarpy and State of Nebraska, have invented a new and valuable Improvement in Corn-Planters; and I do hereby declare that the following is a full, clear, and exact description of the construction and operation of the same, reference being had to the annexed drawings making a part of this specification, and to the letters and figures of reference marked thereon.

Figure 1 of the drawings is a representation of a side elevation of my corn-planter, and Fig. 2 is a plan view of the same. Figs. 3, 4, 5, 6, 7, 8, 9, 10, 11, and 12 are detail views.

This invention has relation to machines which are designed for marking and checking the ground, dropping the corn, and covering the same; and the nature of my invention consists in certain novel contrivances hereinafter described, and specifically indicated in the claim.

In the annexed drawings, A designates the frame of the machine, which is composed of three bars strongly secured together and rigidly attached in front to a draft-pole, B. C C designate transporting-wheels, which turn loosely around an axle, C', and which are connected together by transverse bars $a$, suitably braced, and also by transverse check-row markers $b\ b$. The markers $b\ b$ make impressions in the surface of the ground between the points where the corn is dropped, which enables the operator to plant in perfect check-rows without previous marking. The axle C' has one end bearing in the free end of a crank-arm, $c$, and the other end bearing in one arm of an angular lever, $c'$, the other arm of which latter is pivoted to a long lever, D. The lever $c'$ and the arm $c$ are rigidly secured to the axle C', and the wrist-pin of arm $c$ and lever $c'$ are free to play up and down in slots formed in pendants $d$, which are vertically adjustable on the longitudinal side bars of frame A. This self-adjustment of the studs or wrist-pins allows the markers to rise and descend, and accommodate themselves to the inequalities of surface passed over. E E designate arms, which are secured to the axle C' and extended back through vertically-oblong loops $d'$ depending from the rear cross-bar of frame A. The loops $d'$ afford guides for the arms E, and allow their rear ends free vertical and endwise play, and on the arms E scrapers $e$ are secured, which keep the peripheries of the transporting-wheels clear of adhering earth. Lever D extends up alongside of an arc, F, and is curved over so as to form a handle, which is in close relation to a driver's seat, S, and to this lever D another lever, D', is pivoted, which is acted on by a spring, $s^1$, and constructed with a stud, $t$, on its lower end, which is designed to enter one or the other of three vertical slots, $t'$, made through the arc F, and to hold the parts in the desired position—at the same time allow free vertical play. From the support on which the driver's seat is mounted to the front transverse portions of the frame A is a curved apron or guard, A', which is designed for protecting the legs of the driver, and at the lower end of this apron A' is a treadle, G, which is pivoted to a plate on the draft-pole B and passed through a slotted guide, 2, of this plate, and held up by a spring, 3. The rear end of the treadle G lies upon the front cross-bar of a cranked lever, H, which is free to oscillate in bearing-boxes $g$ fixed to the side bars of frame A. The rear arms of the lever H are bent around the seed-tubes I, and pivoted to the short pitman-rods $h$, which connect said lever-arms to the rear arms of angular levers J, which latter are pressed down by coiled springs 4. The lower or front arm of one of the levers J has an adjustable angular arm, 5, secured to it, which will be struck by the projecting ends 6 of the straight bars $a$ as the wheels C revolve. This raises the dropping-slides $k$ and discharges the corn. By raising the arm 5 the wheels C will turn without the projections 6 striking it, and the operation of dropping may be performed by the driver pressing his foot on the treadle G. The seed-tubes I are rigidly secured to the side bars of the frame A, and at the upper ends of these tubes are hoppers I'. The dropping-slide of each tube is guided by means of a sheath, K, which is held up against the back of the tube I by means of a spring, $s^2$, and a fixed bracket, L. Inside of the tube I, and secured to it, is an inclined guide, $j$, which is directed downward and backward, and to the front side of this guide a lipped striker, $l$, which is held in place by a spring, $m$. The lower lipped end of the striker $l$ is pressed against the seed-slide $k$, and regulates the discharge of the grains of corn from an opening, $n$, through said slide. The size of this opening $n$ can be increased or diminished, as may be desired, by means of an adjustable slide, $o$. On the lower end of each tube I is an opening-tooth, N, which is beveled and curved, as shown in the drawings, for the purpose of moving freely through the soil and leaving a good drill in which to drop the corn. The corn is dropped through the heels of the teeth N at each ascent of the slides $k$. In front of the teeth N are curved colters P for cutting through the sods, and in rear of the teeth N are coverers R, which are applied to the lower ends of stocks R, and are vertically adjustable in the brackets. These coverers have laterally concave bottoms, and they are tapered backward so that their rear ends are smallest. They will thus cover the corn and leave the earth well pressed down upon it. I will here remark that when the slides $k$ are down they are arrested by the levers J bearing upon stop-pins $p$. The marker M is connected by a swivel, $r$, to the rear cross-bar of frame A, and sustained by a brace, M'.

What I claim as new, and desire to secure by Letters Patent, is—

1. The axle C' of connected wheels C C, having its bearing in crank-arms $c$, and an angular lever, $c'$, adjustable in hangers $d$, in combination with levers D D', and the slotted arc F, substantially as described.

2. The arms E E, attached to the axle C', and provided with scrapers $e\ e$, in combination with the guiding-loops $d'$ depending from the rear cross-bar of the frame A, substantially as described, and for the purpose set forth.

In testimony that I claim the above I have hereunto subscribed my name in the presence of two witnesses.

JOHN G. MOLE.

Witnesses:
  J. B. SMITH,
  E. N. ARTHAND.